United States Patent [19]
Putman et al.

[11] Patent Number: 5,243,512
[45] Date of Patent: Sep. 7, 1993

[54] METHOD AND APPARATUS FOR MINIMIZING VIBRATION

[75] Inventors: Thomas H. Putman, Penn Hills Township, Alleheny County; Peter D. Hill, Monroeville, both of Pa.

[73] Assignee: Westinghouse Electric Corp., Pittsburgh, Pa.

[21] Appl. No.: 703,330

[22] Filed: May 20, 1991

[51] Int. Cl.$^5$ .......................................... G05B 13/04
[52] U.S. Cl. ................................ 364/148; 364/400; 364/508; 364/574
[58] Field of Search ............... 364/400, 508, 572, 574, 364/148; 318/114, 128, 629, 649; 310/51; 73/583, 602, 658, 666, 668; 181/207-209; 381/71, 94

[56] References Cited
U.S. PATENT DOCUMENTS

| | | | |
|---|---|---|---|
| 4,025,724 | 5/1977 | Davidson, Jr. et al. | 364/574 X |
| 4,435,751 | 3/1984 | Hori et al. | 364/574 |
| 4,525,791 | 6/1985 | Hagiwara et al. | 364/508 |
| 4,600,863 | 7/1986 | Chaplin et al. | 318/114 |
| 4,821,205 | 4/1989 | Schutten et al. | 364/508 |
| 4,956,789 | 9/1990 | Hamada et al. | 364/508 |

OTHER PUBLICATIONS

GGP Chaplin, "The Cancellation of Repetitive Noise and Vibration by Active Methods"; Date Unknown.
NCI Brochure entitled "Electronic Attenuation of Noise and Vibration"; Date Unknown.
NCI Product Sheet entitled Noise Cancellation Technologies' NCT 2000; 1987.

*Primary Examiner*—Joseph Ruggiero
*Attorney, Agent, or Firm*—D. Schron

[57] ABSTRACT

Vibration of a system such as a motor and pump on a platform or a transformer is minimized by applying a compensating force to the system. The optimum compensating force is determined by measuring the initial vibration and using that measurement in one of three algorithms to determine an adjustment to be made to the compensating force applied to the system at the time the initial vibration was measured. The adjusted compensating force is applied to the system which changes the vibration. That vibration is measured and applied to the selected algorithm to determine a second adjustment to the compensating force. The process is repeated until a compensating force is found which produces zero vibration, minimum vibration or a desired vibration. A plurality of sensors for measuring vibration and a plurality of actuators for applying a compensating force are preferably used.

21 Claims, 5 Drawing Sheets

METHOD AND APPARATUS FOR MINIMIZING VIBRATION

FIELD OF THE INVENTION

The invention relates to an improved method and apparatus for minimizing vibration of a system such as a motor mounted on a frame which vibration is caused by a disturbing force and influenced by a compensating force supplied to the system.

BACKGROUND OF THE INVENTION

Rotating machinery, transformers and other systems frequently produce undesirable vibration and resulting noise. Several efforts have been made at minimizing vibration of some of these systems. One method is to apply a compensating force to the system at a sufficient magnitude and phase to minimize the vibration. In order to determine the compensating force to be applied it is necessary to provide means such as transducers for measuring the vibration and also means for applying a compensating force of known value to the system. Typically, velocity transducers or accelerometers are used to measure the vibration and actuators may be used to apply a compensating force. An initial compensating force of zero is applied to the system and the vibration of the system is measured One then computes a change to make in the compensating force, subtracts the change from the initial compensating force and applies a new force to the system. If the process is repeated over and over again, the vibration output will eventually reach a minimum value. The difficulty with previous systems is that in some situations an unreasonable number of iterations is required before a minimum value is reached. Very often the minimum value cannot be reached because an unacceptable number of iterations is required. Consequently, there is a need for a method of quickly adjusting a compensating force to minimize vibrations.

Typically the prior art has used a single sensor to monitor vibration and a single actuator to apply the compensating force. This arrangement has not been useful for large transformers and other equipment which have several vibrating surfaces. For large complex systems it is desirable to measure the vibration at many locations and to apply compensating forces at several locations. However, prior art systems were not capable of handling multiple outputs and multiple inputs. Until the present invention, the art has been unable to repeatedly process multiple sensor outputs to generate multiple actuator inputs within reasonable amount of time. Consequently, there is a need for a system which can detect vibration from multiple points and which can apply compensating forces at multiple points different from the locations of the force sources.

BRIEF DESCRIPTION OF THE INVENTION

We prefer to provide at least one and preferably more than one sensor for measuring vibration of a system. We also prefer to provide at least one and preferably more than one actuator for providing a compensating force to the system. The number of sensors should be greater than or equal to the number of actuators because an excess of actuators provides no benefit. If the vibrating system has more than one vibrating surface, more than one sensor and more than one actuator must be used.

After the sensors are attached to the system they will produce an output corresponding to the measured vibration. Each harmonic component of the measured vibration may be represented by its complex amplitude (i.e. a complex number having a real part and an imaginary part). If the system has a rotating shaft, one can reference each harmonic to a phasor which represents the shaft position. For any harmonic we then create a column matrix V] whose elements are numbers that correspond to the output of each sensor. Initially, no compensating force is applied to the system. After the values of V] are found we then multiply V] by one of three algorithms to find a correction factor for adjusting the compensating force applied to the system. That compensating force can be expressed as a column matrix F] whose elements are numbers that correspond to the input of each actuator. Initially all values of F] are zero. After the first correction force F] is found, we then apply the force $F]_1$ to the system. Said force application results in a change in the vibration of the system so that V] has a new value $V]_1$. This new V] is processed through the same algorithm to define a new correction force. The new force is combined with the most recently applied force to create another compensating force. The new force is applied to the system and the process is repeated. After several iterations the vibration of the system reaches a minimum value which may be zero for some systems.

Our methods will find the minimum value within a reasonable time and will not require an unreasonable number of iterations. Other objects and advantages of our invention will become apparent as a description of the preferred embodiments proceeds.

VIBRATING SYSTEMS

Figure 1:
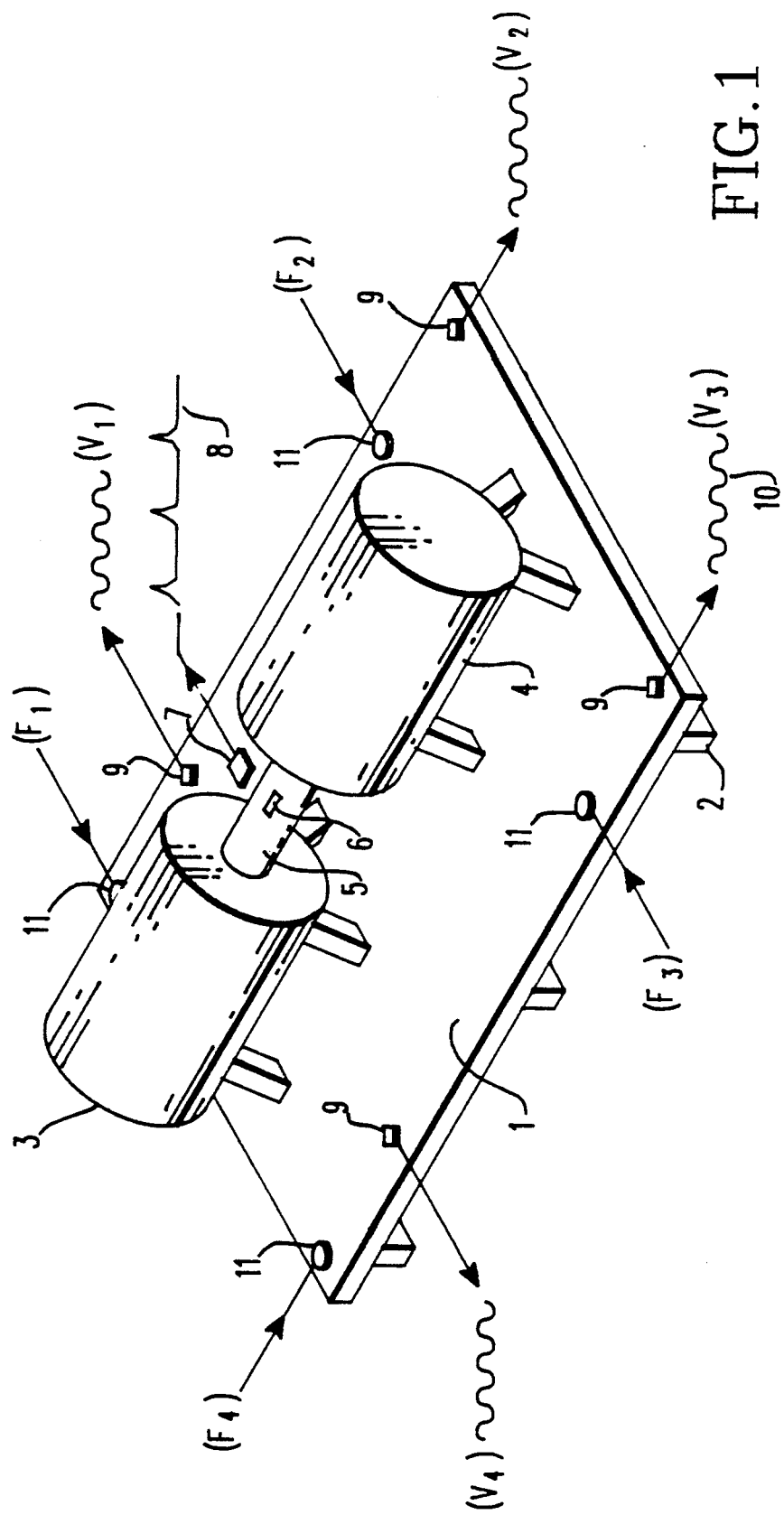
FIG. 1 is a diagram showing a simple vibration system containing a pump and motor on which vibration measurements are taken and compensating forces are applied in accordance with the present invention.

In FIG. 1 we show a vibrating system comprised of platform 1 on which there is a motor 3 which drives pump 4 through shaft 5. Although we have illustrated a pump and motor in FIG. 1, it should be understood that our method can be used for other vibrating systems. We consider our method to have particular applicability to reducing vibration in ships, particularly for a ship's service turbogenerator and a main propulsion unit as well as its pumps or other apparatus. A marker 6 which may be a magnet is provided on shaft 5. Shaft sensor 7 is provided to respond to the marker 6 as it passes by. Shaft sensor 7 will have an output signal 8 in which each peak corresponds to the passage of marker 6 under the sensor. Thus, each peak or blip in wave 8 corresponds to one rotation of the shaft. The platform 1 is supported by platform supports 2 which may be mounted on the floor of a building or within a vehicle such as a submarine. We provide a plurality of vibration sensors 9 on the platform to detect vibration of the platform. These sensors are generally indicated as diamonds and are positioned about the platform. The sensors preferably are transducers or accelerometers which will generate a periodic wave output 10. Each harmonic of this output can be expressed as a complex number as hereinafter described. Each output is generally designated by $V_i$ such that the output from the first sensor is $V_1$, the second sensor output is $V_2$, the third sensor output is $V_3$ and the fourth sensor output is $V_4$. We also provide actuators 11 on the platform for applying a compensating force. The compensating force is a combination of the forces applied to each of the actuators. The force applied to the first actuator is $F_1$; the force supplied to the second actuator is $F_2$; the force supplied to the third actuator is $F_3$; and the force supplied to the fourth actuator is $F_4$. An equal number of actuators and sensors is not necessary. A greater number of sensors than actuators may be used. There is no benefit, however, to using more actuators than sensors because the extra actuators are redundant. Although we have shown sensors and actuators placed on a horizontal platform, it should be understood that our method is not so limited.

Figure 2:
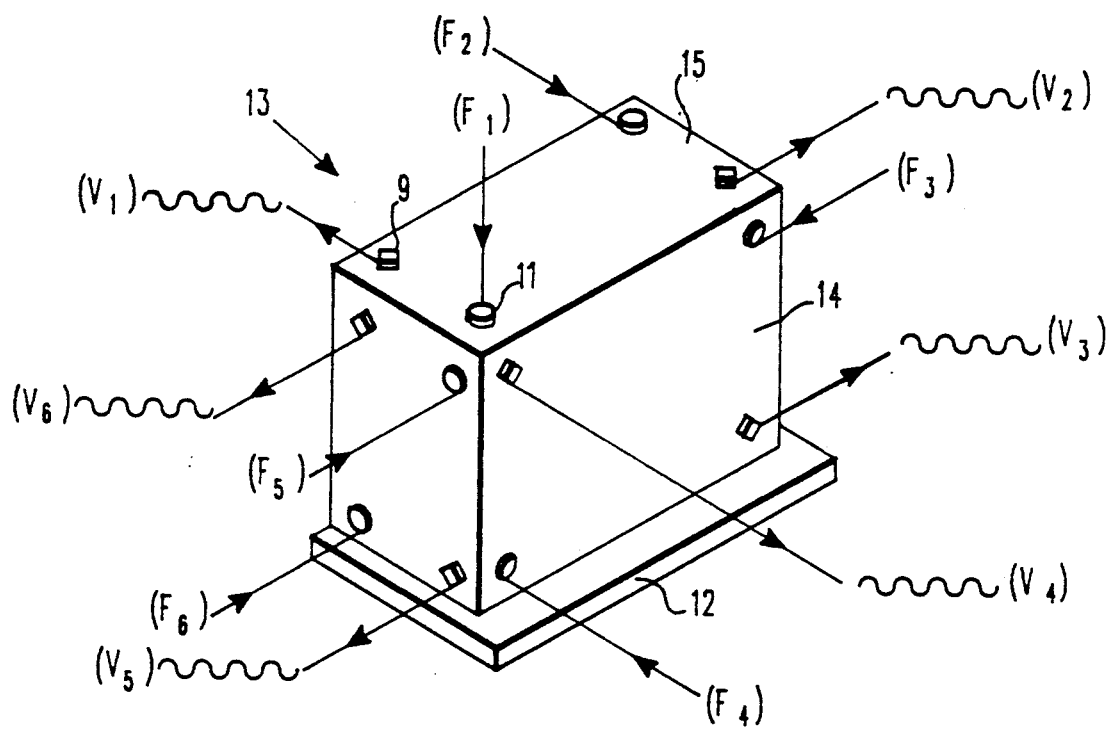
FIG. 2 is a diagram of a transformer on which vibration measurements are taken and compensating forces are applied in accordance with the present invention.

The method can be used to reduce vibration at a point, along a line, or a surface, or over a volume. For example, if we had a transformer tank wall one could reduce the vibration by having one or two actuators acting directly on each wall and having accelerometers which are distributed so as to adequately sample the wall motion. Such a system is shown in the diagram of FIG. 2. A transformer 13 having four sides 14 and top 15 is positioned on slab 12. As in the embodiment of FIG. 1 we provide a plurality of sensors 9 indicated by diamonds. Six of those sensors can be seen in FIG. 2. Those sensors generate outputs $V_1$ thru $V_6$. We also provide a plurality of actuators 11 indicated by cycles. The six actuators shown in FIG. 2 receive input forces $F_1$ thru $F_6$.

The harmonic forces applied to the system can be expressed as a column matrix containing the complex amplitude of harmonic force input to each of the actuators. Similarly, the output of the sensors can be expressed as a column matrix V] whose elements are the complex amplitude of the harmonic output of the sensors. For the system of FIG. 1, $$F] = \begin{pmatrix} F_1 \\ F_2 \\ F_3 \\ F_4 \end{pmatrix}$$

and $$V] = \begin{pmatrix} V_1 \\ V_2 \\ V_3 \\ V_4 \end{pmatrix}$$

The vector or column matrix F] represents the complex amplitudes of the applied forces at a specific frequency. For any system, vector F] will have n elements as follows:

$$F] = \begin{pmatrix} F_1 \\ F_2 \\ \cdot \\ \cdot \\ \cdot \\ F_n \end{pmatrix} \tag{1}$$

If the harmonic frequency is w, then the time function represented by each element of F] is obtained according to $$f_x(t) = \text{Re } F_k e^{jwt} \tag{2}$$

Where Re means take the real part. For example suppose $$F_k = c + jd \tag{3}$$

where c and d are real numbers. Then $$f_k(t) = \text{Re } [(c+jd)e^{jwt}] \tag{4}$$

$$f_k(t) = c \cos wt - d \sin wt \tag{5}$$

Equation 5 is obtained by making use of the fact that $$e^{jwt} = \cos wt + j \sin wt \tag{6}$$

Thus the complex number $F_k$ represents a sinusoidal time function. When the force F acts on the plant there is a corresponding velocity response at each of the m sensors. The response is, of course, sinusoidal at frequency w and each velocity can be represented by a complex number as illustrated for the forces. The velocity response vector is given by the column matrix.

$$V] = \begin{pmatrix} V_1' \\ V_2' \\ \cdot \\ \cdot \\ \cdot \\ V_m' \end{pmatrix} \tag{7}$$

which has m elements as indicated in equation 7.

The relationship between the response V'] and the excitation F] is given by the matrix equation $$V'] = [Y] F] \tag{8}$$

where [Y] is called the transfer admittance matrix. The dimensions of [Y] are m×n. That is, it has m rows and n columns. There is one row for each sensor and one column for each actuator. Thus $$[Y] = \begin{pmatrix} Y_{11} & \cdot & \cdot & \cdot & Y_{1n} \\ Y_{21} & \cdot & \cdot & \cdot & Y_{2n} \\ \cdot & & & & \cdot \\ \cdot & & & & \cdot \\ Y_{m1} & Y_{m2} & \cdot & \cdot & Y_{mn} \end{pmatrix} \tag{9}$$

Figure 3:
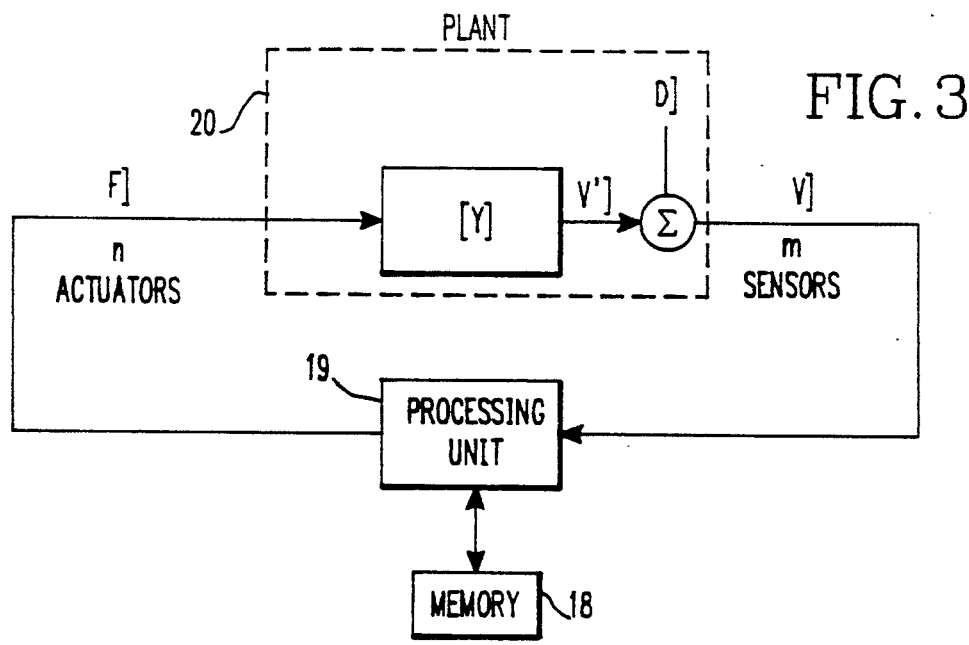
FIG. 3 is a block diagram of a physical plant with vibration cancellation.

The velocity which is measured by the sensors is represented by the column matrix or vector V]. FIG. 3 is a block diagram of a general representation of a plant 20 showing the matrices F], [Y] and V] just described. Output V] is directed to processing unit 19 which will use that sensor output V] to calculate the forces F] to be applied by the actuators according to a program contained in memory 18. One can see that $$V] = D] + [Y] F] \tag{10}$$

where the vector D] is the disturbing velocity vector.

If there are the same number of force sources as sensors (i.e. m=n); then [Y] is a square matrix, and one can potentially make the velocity vector V] equal to zero. The appropriate forces to apply are obtained by solving Equation 10 with V] set equal to zero. The result is $$F] = -[Y]^{-1} D] \tag{11}$$

For a solution to Equation 11 to exist, the matrix [Y] must not be singular. That is, the determinate of [Y] must be nonzero.

The general case is when there are more sensors than force sources (m>n). In this case one cannot null out the velocity V] because there are not enough independent force sources. However, one can consider the possibility of minimizing the vector V] in some sense.

The Gradient Method

To minimize the vibration of the plant shown in FIG. 1, the art has developed the gradient method to determine what forces to apply to the system. The gradient method has serious limitations when applied in practice. Unfortunately, it is not unusual to have plant characteristics which result in extremely slow convergence.

Consider the plant shown in FIG. 3. The vibration is represented by the column-matrix or vector V]. The disturbing vibration is represented by D] and the plant is characterized by the matrix [Y]. Equation 10 is the plant equation, namely, $$V] = D] + [Y] F]$$

which relates output vibration V] to the disturbance D] and the compensating force F].

The vibration power is defined as $$p = \underline{V}^* V] \tag{12}$$

wherein $\underline{V}$ indicates the row matrix which is the transpose of the column matrix V]. $\underline{V}^*$ indicates the conjugate of $\underline{V}$.

In the absence of compensating forces, F]=0], the output power is $$p = \underline{D}^* D] \tag{13}$$

It is required to find the compensating forces F] which will minimize the vibration output power p.

The direct gradient method is an iterative approach whereby one measures the output velocity V], computes a change H] (based on a gradient calculation) to make in the compensating force F], subtracts the change from the compensating forces F] and applies the new force to the plant. If the process is repeated over and over again, the vibration output power will eventually reach a minimum value. Although acquisition of the minimum power is certain, it may take an unacceptable number of iterations.

Acquisition of the minimum is governed by a set of n eigenvalues where n is the number of compensating forces or the number of elements in the force matrix F]. Suppose $$F] = \begin{pmatrix} F_1 \\ \cdot \\ \cdot \\ \cdot \\ F_j \\ \cdot \\ \cdot \\ \cdot \\ F_n \end{pmatrix} \tag{14}$$

The j-th element of F] is the force applied by the j-th actuator and the complex amplitude of the harmonic sinusoidal function.

During the iterative optimization process, each force, the $F_j$, converges to its optimum value, $\overline{F}_j$, according to the equation of the form $$F_j(k) = C_{j1} \lambda_1^k + C_{j2} \lambda_2^k + \ldots C_{jm} \lambda_n^k + \overline{F}_j \tag{15}$$

In the above equation successive iterations are designated by k which takes on the values, 0, 1, 2, ... etc. The $\lambda$'s are eigenvalues and are real numbers in the range $-1 < \lambda 1$ if the minimization process converges.

The n eigenvalues depend only on the plant matrix [Y] and may be calculated as follows (1) Find the [A] matrix which is defined as $$[A] = [Y]^{*T} [Y] \tag{16}$$

wherein $[Y]^{*T}$ is the transposed conjugate of the matrix [Y]

(2) Find the eigenvalues of the corresponding eigenvectors of [A] by solving the equation $$[A] X] = \lambda X] \tag{17}$$

[A] will be an n×n matrix with rank n. Therefore, there will be n values for $\lambda$ and n corresponding vectors X].

(3) Form the modal matrix $[L_a]$ and the eigenvalue matrix $[\Gamma_a]$.

$$[L_a] = [\underbrace{l]}_{1}, \underbrace{l]}_{2}, \ldots \underbrace{l]}_{n}] \tag{18}$$

$$[\Gamma_a] = \begin{pmatrix} \gamma_1 & 0 & \ldots & 0 \\ 0 & \gamma_2 & \ldots & 0 \\ \cdot & \cdot & & \cdot \\ \cdot & \cdot & & \cdot \\ 0 & \cdot & \ldots & \gamma_n \end{pmatrix} \tag{19}$$

The modal matrix, $[L_a]$, has for its columns the eigenvectors of Equation 17. The eigenvalue matrix is a diagonal matrix with the eigenvalues on the main diagonal.

The eigenvalue $\gamma_1$ corresponds to the eigenvector $[\iota]$ so that $$[A]\underline{\iota} = \gamma_1^1 \quad (20)$$

(4) Next find the matrix $[\lambda]$ by evaluating $$[\lambda] = [I] - 2\mu \, [\Gamma_a] \quad (21)$$

which results in $$[\lambda] = \begin{pmatrix} (1 - 2\mu\gamma_1) & . & & . . & 0 \\ 0 & (1 - 2\mu\gamma_2) & . . & 0 \\ . & & . & . . \\ . & & & . . \\ 0 & . & & . & (1 - 2\mu\gamma_n) \end{pmatrix} \quad (22)$$

$[\lambda]$ is a diagonal matrix whose main diagonal elements are the $\lambda$'s of Equation 15. The sensitivity of the algorithm is $\mu$ and has an effect on the values of the $\lambda$'s.

If $\mu$ is adjusted so that all the $\lambda$'s lie in the range $-1 < \lambda < 1$, then the direct-gradient algorithm will converge. However, the direct gradient approach is not always practical because it may lead to excessive convergence times if any $\lambda$ happens to be nearly one. Such a situation occurs frequently in practice.

DESCRIPTION OF THE PREFERRED EMBODIMENTS

We have developed an iterative approach to minimize vibration which will converge to the compensating force that causes minimal vibration with as little as one iteration. Our approach utilizes a change of coordinates which is determined by the modal matrix $[L_a]$. We provide three successive embodiments each of which is an improvement on the previous embodiment. It should be pointed out, however, that the embodiments are equivalent as far as the final result is concerned. They are different means to the same end.

Figure 4:
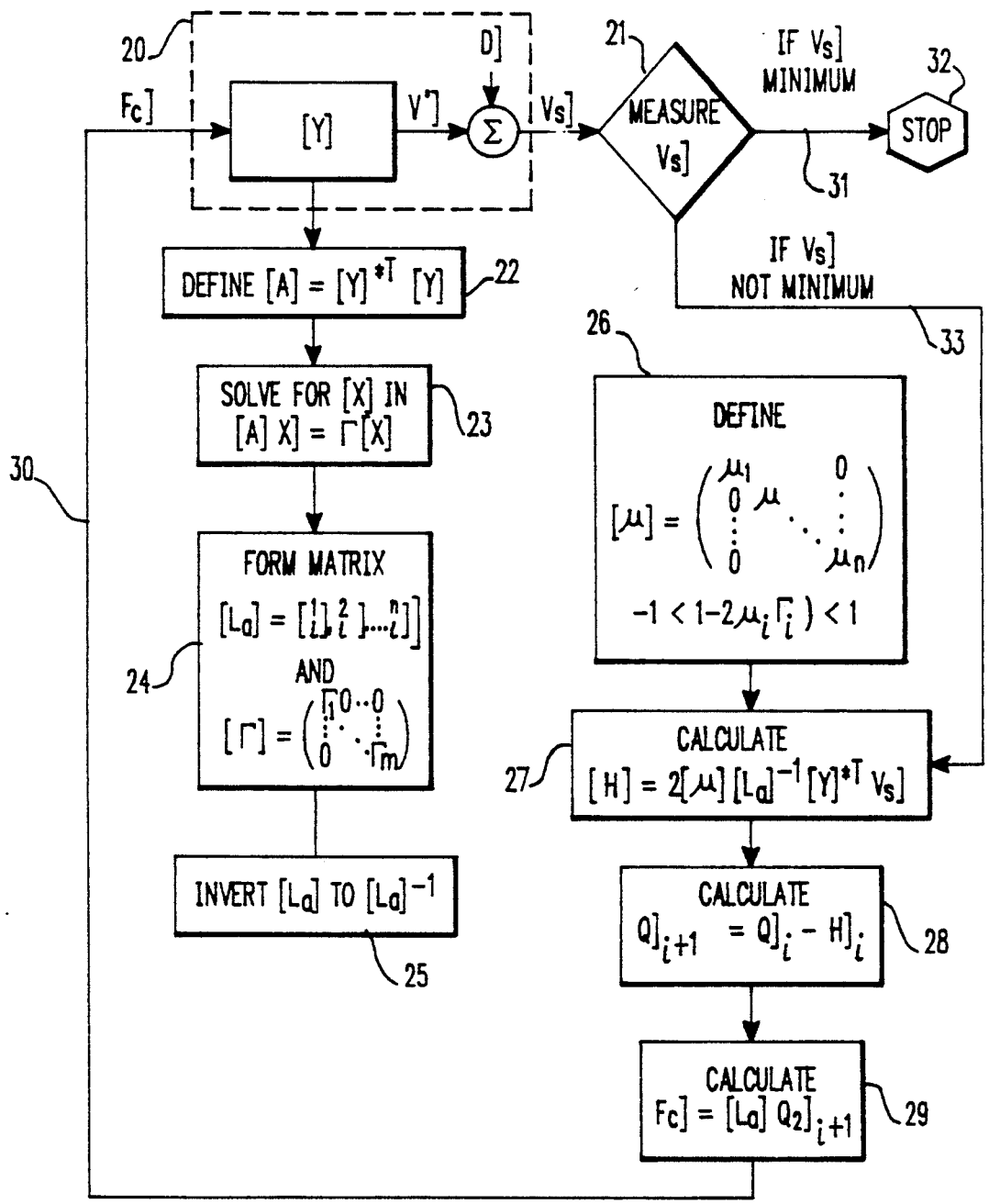
FIG. 4 is a block diagram of a first present preferred method for minimizing vibration.

FIG. 4 illustrates the first embodiment which we call the Q coordinate method. Block 20 represents a vibrating system such as is shown in FIGS. 1, 2 and 3. There is a compensating force $F_c]$, a disturbance $D]$, and a transfer admittance matrix $[Y]$, and a resulting vibration $V_s]$.

To minimize vibration $V_s]$ of system 20, we first measure $V_s]$ as indicated at block 21 when no compensating force is applied, i.e. $F_c]=0$. Then we use that $V_s]$ at block 27 in our first preferred algorithm to solve for a correction factor $H]$. The first preferred algorithm is created by first defining matrix $[A]$ at box 22 such that $[A] = [Y]^{*T}[Y]$ wherein $[Y]$ is the transfer admittance matrix for the system and $[Y]^{*T}$ is the conjugate transpose of matrix $[Y]$. Then at box 23, we solve the equation $[A]X] = \Gamma[X]$ wherein $\Gamma = \Gamma_1$ thru $\Gamma_n$ are eigenvalues of $[A]$ and $X] = \iota^n]$ is the eigenvector associated with the eigenvalue $\Gamma_n$.

Then at step 24 we form a modal matrix $[L_a]$ and eigenvalue matrix $[\Gamma]$. Then we invert $[L_a]$ to form $[L_a]^{-1}$ as indicated at box 25.

The next step at block 26 is to define $[\mu]$ as the diagonal matrix.

$$[\mu] = \begin{pmatrix} \mu_1 & . & & . . & 0 \\ 0 & \mu_2 & . . & 0 \\ . & & . & . . \\ . & & & . . \\ 0 & . & & . . & \mu_n \end{pmatrix} \quad (23)$$

Such that $\mu_1$ thru $\mu_n$ are selected so that
$-1 < 1 - 2 \, \mu_i \Gamma_i < 1$ and preferably $0 < 1 - 2\mu_i 21$ 1

Then $[\lambda]$ becomes $$[\lambda] = \begin{pmatrix} (1 - 2\mu_1\Gamma_1) & . & & . . & 0 \\ 0 & (1 - 2\mu_2\Gamma_2) & . . & 0 \\ . & & . & . . \\ . & & & . . \\ 0 & . & & . & (1 - 2\mu_n\Gamma_n) \end{pmatrix} \quad (24)$$

Now we have established all of the variables to solve our first preferred algorithm for correction factor $H]$. At block 27 we calculate the correction in the Q coordinates $$H] = 2 \, [\mu][L_a]^{-1} \, [Y]^{*T} V_s] \quad (25)$$

At step 28 we find the force in the Q coordinates which is related to the original F coordinates by the transformation $$F = [L_a] \, Q] \text{ or} \quad (26)$$

$$Q] = [L_a]^{-1} \, F] \quad (27)$$

Each iteration results in a change in the $Q]$ vector which is transformed to the corresponding $F]$ vector and applied to the plant. The change in the $Q]$ vector is $H]$ and is calculated as indicated by block 27 from the velocity by the equation $$H] = 2 \, [\mu] \, L_a]^{-1} \, [Y]^{*T} V_s \quad (28)$$

The algorithm sensitivity is no longer a scalar $\mu$ but now a diagonal matrix $[\mu]$. This change permits one to control each of the n eigenvalues which govern the rate of convergence. We calculate the force correction in the Q coordinates at block 28 by evaluating $Q]_{i+1} = Qi] - H_i]$. This enables us to find a compensating force $F_c]$ at block 29 evaluating $$F_c]_{i+1} = [L_a] \, Q]_{i+1}$$

Then we apply that compensating force $F_c]$ to the system as indicated by arrow 30. This force changes the vibration $V_s]$ to some new vibration $V_s]_{i+1}$. We again measure the vibration $V_s]$ at block 21. If the vibration has reached zero or a minimum value we may stop as indicated by arrow 31 and block 32. However, it is not necessary to stop. The iteration process can be continued for as long as is desired.

Figure 5:
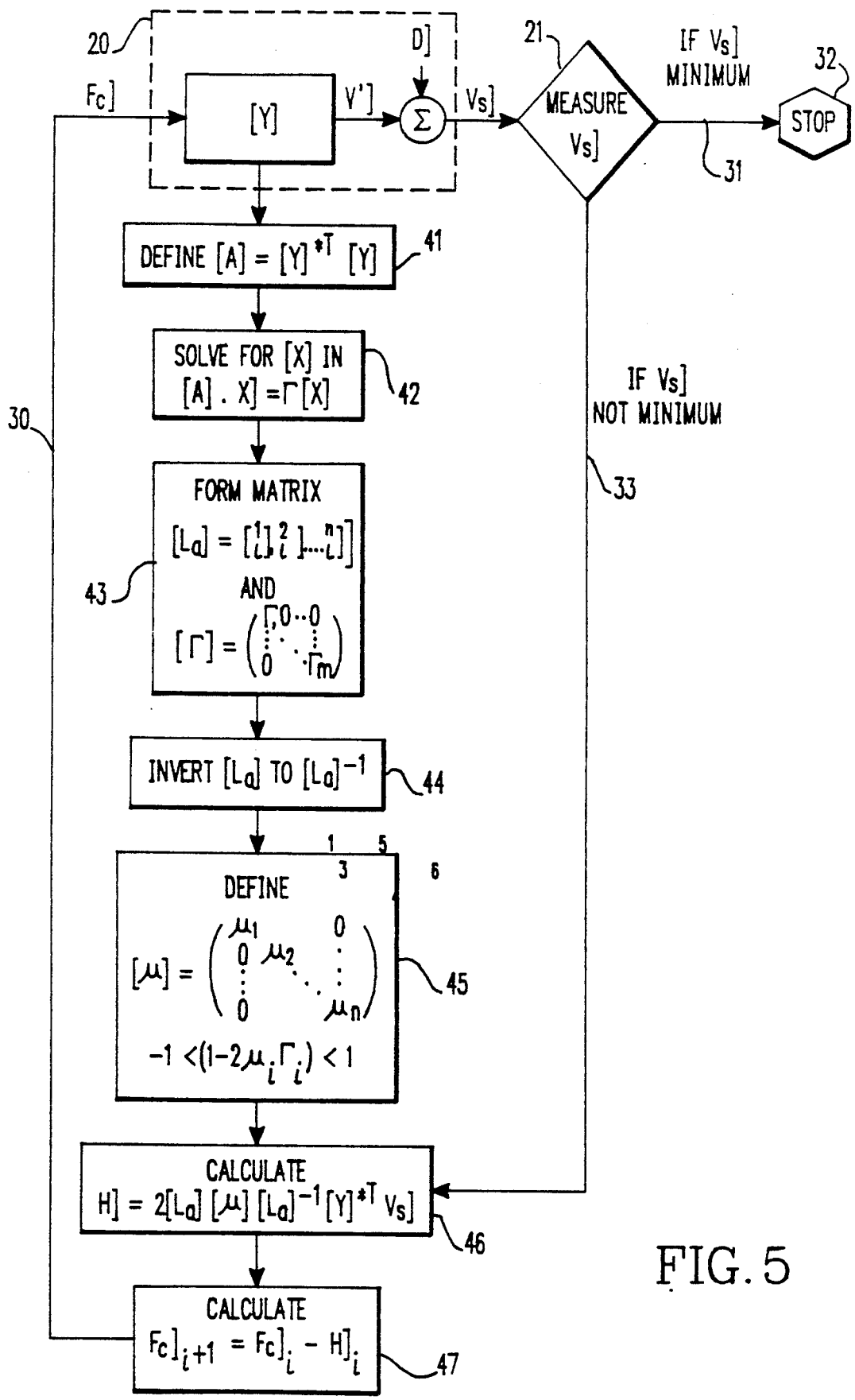
FIG. 5 is a block diagram of a second present preferred method for minimizing vibration.

In a second preferred embodiment shown in FIG. 5, the transformation back to the F-coordinate system is done before the correction $H]$ is calculated. We call this embodiment the F-coordinate method. As a result $H]$ becomes the correction in the F-coordinate system. As in the first embodiment we have a plant 20 which produces a vibration $V_s$] resulting from system characteristics represented by transfer admittance matrix [Y] and disturbance force D]. We measure that vibration at block 21 and use it in our second preferred algorithm at step 46.

Our second preferred algorithm is set forth in block 46 and is $$H] = 2[L_a][\mu][L_a]^{-1}[Y]^{*T}V_s]$$

To develop the values for this algorithm we define [A] at block 41, find the eigenvalues and eigenvectors of [A] at block 42, form eigenvector matrix $[L_a]$ and the eigenvalue matrix $[\Gamma]$ at block 43, invert $[L_a]$ to $[La]^{-1}$ at block 44 and define $[\mu]$ at block 45 in the same manner as in the first embodiment of FIG. 3. Then we calculate our second preferred algorithm at box 46 for correction factor H]. To obtain the next compensation force $F_c]_{i+1}$ we calculate $F_c]_{i+1} = F_c]_i - H]_i$ wherein $F_c]_i$ is the compensating force applied to the system when the $V_s]$ used in block 46 was determined. Usually $F_c]$ is initially zero. As in the first embodiment, we apply the calculated compensating force $F_c]_{i+1}$ to the system as indicated by arrow 30. This results in a new $V_s]_{i+1}$ which is measured and used in the next iteration indicated by arrow 33. The process may be repeated indefinitely or until a compensation force is found which produces a minimum or zero vibration $V_s]$. Indeed, for some applications we have continued the method for as long as the system has been operating. Continuous operation is particularly useful where outside forces which act on the system may change or where one is otherwise unable to be sure that a minimum vibration has been attained.

Figure 6:
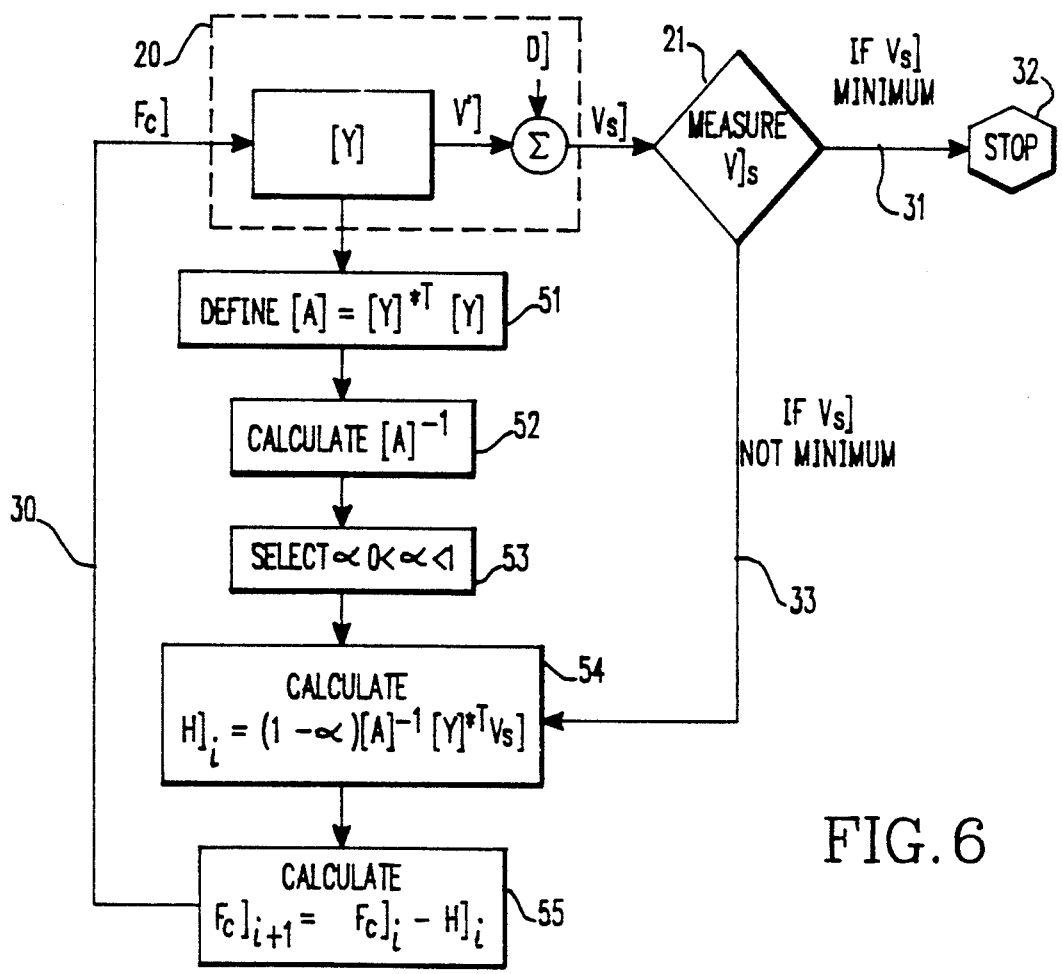
FIG. 6 is a block diagram of a third present preferred method for minimizing vibration.

In a third preferred embodiment shown in FIG. 6, the correction is made in the F-coordinate system and all n eigenvalues are equal to $\alpha$. We call this embodiment the equal eigenvalues method. Here we use a third preferred algorithm set forth in box 54 which is $$H] = (1-\alpha)[A]^{-1}[Y]^{*T}V_s]$$

The values for the third preferred algorithm are obtained by defining matrix [A] at block 51 as in the previous embodiment. Then we calculate $[A]^{-1}$ at block 52. In this embodiment we select at step 53 some $\alpha$ which is a positive number less than 1. We then use that $\alpha$ in our algorithm and solve the algorithm of step 54 for correction factor $H]_i$. Then we calculate at block 55 a compensating force $F_c]_{i+1}$ by subtracting the correction factor $H]_i$ from the compensating force $F_c]_i$ applied when the $V_s]$ used in the algorithm to establish H] was measured. As in the previous embodiments we may continue the iterations indefinitely. Evaluating the correction is simpler than before since neither $[L_a]$ nor $[\Gamma]$ is required.

To further illustrate our methods, we provide the following non limiting examples:

EXAMPLE I

Assume we have a system in which two sensors are used to measure the vibration $V_s]$ and two actuators are used to apply the compensating force $F_c]$. The plant transfer function [Y] is a real two by two matrix. We will use the third preferred algorithm embodiment, or equal eigenvalues method, and define for this system that $$[Y] = \frac{1}{21}\begin{pmatrix} 11 & -10 \\ -10 & 11 \end{pmatrix} \text{ and } V] = [Y]F] + D]$$

$$[A] = [Y]^{*T}[Y]$$

$$[A] = \frac{1}{(21)}\begin{pmatrix} 11 & -10 \\ -10 & 11 \end{pmatrix}\frac{1}{21}\begin{pmatrix} 11 & -10 \\ -10 & 11 \end{pmatrix}$$

$$= \frac{1}{(21)^2}\begin{pmatrix} 221 & -220 \\ -220 & 221 \end{pmatrix}$$

From this matrix:

$$[A]^{-1} = \begin{pmatrix} 221 & 220 \\ 220 & 221 \end{pmatrix}$$

So $$[A]^{-1}[Y]^{*T} = \begin{pmatrix} 11 & 10 \\ 10 & 11 \end{pmatrix}$$

Let $\alpha = \frac{1}{2}$

Then $$H]_i = (1-\alpha)[A]^{-1}[Y]^{*T}V_i] = \frac{1}{2}\begin{pmatrix} 11 & 10 \\ 10 & 11 \end{pmatrix}V_i]$$

and $$F]_{i+1} = F]_i - H]_i = F]_i - \frac{1}{2}\begin{pmatrix} 11 & 10 \\ 10 & 11 \end{pmatrix}V_i]$$

This recursive equation will drive $V_i]$ to zero at a rate of 6 db per iteration.

EXAMPLE II

In this example, we have two sensors and one actuator. In addition, the plant transfer function [Y] is complex. We again use the third preferred algorithm and have a system in which m = 2 n = 1 where m = number of sensors and
n = number of actuators
[Y] is complex
The Plant transfer function is:

$$[Y] = \begin{pmatrix} 1+j \\ 1-j \end{pmatrix} \quad V] = [Y]F] + D]$$

Then $[Y]^{*T} = [(1-j)(1+j)]$ $$[A] = [Y]^{*T}[Y] = [(1-j)(1+j)]\begin{pmatrix} (1+j) \\ (1-j) \end{pmatrix} =$$

[4] (a 1 × 1 matrix with a real element!)

$$[A]^{-1} = \left(\frac{1}{4}\right)$$

$$[A]^{-1}[Y]^{*T} = \left(\frac{1}{4}\right)[(1-j)(1+j)]$$

Let $\alpha = \frac{1}{2}$

-continued

Then $$H]_k = (1-\alpha)[A]^{-1}[Y]^{*T}V]_k = \frac{1}{8}[(1-j)(1+j)V]_k$$

and $$F]_{k+1} = F]_k - H]_k = F]_k - \frac{1}{8}[(1-j)(1+j)]V]_k$$

Since $n=1$ and $m=2$ $$F] = [F_1] \qquad V] = \begin{pmatrix} V_1 \\ V_2 \end{pmatrix}$$

a single element column matrix    a two element column matrix $$[F_1]_{k+1} = [F_1]_k - \frac{1}{8}[(1-j)(1+j)]\begin{pmatrix} V_1 \\ V_2 \end{pmatrix}_k$$

In this case, because $m > n$, the velocity will not be driven to zero but to a value which minimizes $$P = [V_1 \; V_2] * \begin{pmatrix} V_1 \\ V_2 \end{pmatrix} = V_1 * V_1 + V_2 * V_2$$

Although we have described and illustrated certain present preferred embodiments of our method, it should be understood that the invention is not limited thereto but may be variously embodied within the scope of the following claims.

We claim:

1. An improved method for minimizing vibration of a system represented by a column matrix $V_s$] and caused by a disturbing force acting on the system, the disturbing force represented by a column matrix D] the system being characterized by an m×n transfer admittance matrix [Y] comprising the steps of:
   a) providing a compensating force represented by column matrix $F_c$] which may initially equal zero, and which can be changed as may be required by this method, such that a change in the compensating force will cause a change in the vibration $V_s$];
   b) measuring the vibration $V_s$];
   c) defining a matrix $[A]=[Y]^{*T}[Y]$ wherein $[Y]^{*T}$ is a transpose conjugate of the matrix [Y];
   d) finding the eigenvalues and vectors of [A] by solving an equation $[A]\cdot X]=\Gamma[X]$ wherein $\Gamma=\Gamma_1$ thru $\Gamma_n$ are eigenvalues of [A] and $X]=\eta$ are corresponding eigenvectors;
   e) forming a modal matrix $$[L_a] = [\eta_1 \; \eta_2 \ldots \eta_n];$$

f) inverting $[L_a]$ to create $[L_a]^{-1}$;
   g) defining $[\mu]$ as matrix $$[\mu] = \begin{pmatrix} \mu_1 & . & \ldots & 0 \\ 0 & \mu_2 & \ldots & 0 \\ . & . & . & . \\ . & . & . & . \\ 0 & . & \ldots & \mu_n \end{pmatrix}$$

such that $\mu_1$ thru $\mu_n$ are selected so that $-1<(1-2\mu_i\Gamma_i)<1$ where $i=1, 2, \ldots n$;
   h) solving for $H]_i = 2 [\mu]L_a]^{-1} [Y]^{*T}V_s]$;
   i) solving for $Q]_{i+1} = Q]_i - H]_i$ wherein $Q]_i$ may initially equal zero;
   j) solving for $F_c]_{i+1} = [L_a] Q]_{i+1}$;
   k) applying the force $F_c]_{i+1}$ to the system;
   l) thereafter measuring the vibration $V_s$]; and
   m) repeating steps c thru l until $V_s$ reaches one of a minimum value and a desired value.

2. The method of claim 1 wherein the vibration is measured by m transducers each of which produces a harmonic with complex amplitude V where $k=1, 2, \ldots$ m and column matrix $V_s$] is comprised of $V_1$ thru $V_m$.

3. The method of claim 1 wherein the compensating force is provided by n actuators each of force $F_k$ where $k=1, 2, \ldots$ n and values of column matrix $F_c$] are comprised of $F_1$ thru $F_n$.

4. The method of claim 1 wherein the vibration is measured by sensors, the compensating force is applied by actuators and more sensors than actuators are used.

5. The method of claim 1 wherein the $\mu$'s are chosen such that $0 < 1 - 2\mu_i\Gamma_i < 1$ for $i = 1, 2, \ldots$ n.

6. The method of claim 1 wherein all $\mu_i\Gamma_i$ are equal to one another such that $$\mu_i\Gamma_i = \frac{1-\alpha}{2} \text{ and } 0 < \alpha < 1.$$

7. The method of claim 1 wherein the system is a transformer.

8. An improved method for minimizing vibration of a system represented by a column matrix $V_s$] and caused by a disturbing force acting on the system, the disturbing force represented by a column matrix D] the system being characterized by an m x n transfer admittance matrix [Y] comprising the steps of:
   a) providing a compensating force represented by column matrix $F_c$] which may initially equal zero, and which can be changed as may be required by this method, such that a change in the compensating force will cause a change in the vibration $V_s$];
   b) measuring the vibration $V_s$];
   c) defining a matrix $[A]=[Y]^{*T}[Y]$ wherein $[Y]^{*T}$ is a transposed conjugate of the matrix [Y];
   d) solving for [X] in the equation $[A]\cdot X]=\Gamma[X]$ wherein $\Gamma=\Gamma_1$ thru $\Gamma_n$ which are eigenvalues of [A] and $X]=\eta$ is an eigenvector associated with the eigenvalue $\Gamma_k$
   e) forming a modal matrix $$[L_a] = [\eta_1 \; \eta_2 \ldots \eta_n];$$

f) inverting $[L_a]$ to create $[L_a]^{-1}$;
   g) defining $[\mu]$ as matrix $$[\mu] = \begin{pmatrix} \mu_1 & . & \ldots & 0 \\ 0 & \mu_2 & \ldots & 0 \\ . & . & . & . \\ . & . & . & . \\ 0 & . & \ldots & \mu_n \end{pmatrix}$$

such that the $\mu$'s are selected so that $-1 < 1 - 2\mu_i\Gamma_i < 1$ where $i=1, 2 \ldots$ n;
   h) solving for $$H]_i = 2 [L_a] [\mu] [L_a]^{-1} [Y]^{*T} V_s];$$

i) solving for $F_c]_{i+1} = F_c]_i - H]_i$ wherein $F_c]_i$ may initially equal zero and when this step is repeated $F_c]_i$ equals the $F_c]$ determined when this step was previously performed;

j) applying the force $F_c]_{i+1}$ to the system;

k) thereafter measuring the vibration $V_s$];

l) repeating steps h thru k until $V_s$] reaches one of a minimum value and a desired value.

9. The method of claim 8 wherein the vibration is measured by m transducers each of which produces a harmonic with a complex amplitude $V_k$ where $k = 1, 2, \ldots m$ and column matrix $V_s$] is comprised of $V_1$ thru $V_m$.

10. The method of claim 8 wherein the compensating force is provided by n actuators each of which produce a harmonic force $F_k$ where $k = 1, 2, \ldots n$ with a complex amplitude and column matrix $F_c$] is comprised of $F_1$ thru $F_n$.

11. The method of claim 8 wherein the vibration is measured by sensors, the compensating force is applied by actuators and more sensors than actuators are used.

12. The method of claim 8 wherein $0 < (1 - 2\mu_i \Gamma_i) < 1$.

13. The method of claim 8 wherein all $\mu_i \Gamma_i$ are equal to one another such that $$\mu_i \Gamma_i = \frac{1 - \alpha}{2}$$

and $0 < \alpha < 1$.

14. The method of claim 8 wherein the system is a transformer.

15. An improved method for minimizing vibration of a system represented by a column matrix $V_s$] and caused by a disturbing force acting on the system, the disturbing force represented by a column matrix D] the system being characterized by an m×n transfer admittance matrix [Y] comprising the steps of:

a) providing a compensating force represented by column matrix $F_c$] which may initially equal zero, and which can be changed as may be required by this method, such that a change in the compensating force will cause a change in the vibration $V_s$];

b) measuring the vibration $V_s$];

c) defining a matrix $[A] = [Y]^{*T}[Y]$ wherein $[Y]^{*T}$ is a transposed conjugate of the matrix [Y];

d) selecting some $\alpha$ where $0 < \alpha < 1$;

e) determining H] by solving the equation $H] = (1-\alpha)[A]^{-1} [Y]^{*T} V_s$] wherein $[A]^{-1}$ is an inverse of [A];

f) solving for $F_c]_{i+1} = F_c]_i - H]_i$;

g) applying the force $F_c]_{i+1}$ to the system;

h) thereafter measuring the vibration $V_s$]; and i) repeating steps b, e, f, g and h until $V_s$] reaches one of a minimum value and a desired value.

16. The method of claim 15 wherein the vibration is measured by m transducers each of which produces a harmonic with a complex amplitude $V_k$ where $k = 1, 2, \ldots m$ and column matrix $V_s$] is comprised of $V_1$ thru $V_m$.

17. The method of claim 15 wherein the compensating force is provided by n actuators each of which produce a harmonic with a complex amplitude $F_k$ where $k - 1, 2, \ldots n$ and the values of column matrix $F_c$] is comprised of $F_1$ thru $F_n$.

18. The method of claim 15 wherein the vibration is measured by sensors, the compensating force is applied by actuators and more sensors than actuators are used.

19. The method of claim 15 wherein the system is a transformer.

20. An improved transformer of the type having walls which vibrate during operation of the transformer wherein the improvement comprises a) a plurality of sensors attached to the walls and connected to control means which sensors each generate a signal corresponding to a vibration of the wall to which the sensor is attached;

b) control means for receiving input from sensors and calculating forces from that input in accordance with at least one of Q-coordinate method, F-coordinate method and equal eigenvalues method and outputting directions to actuators to apply those forces; and c) a plurality of actuators connected to the control means and attached to the walls of the transformer for applying forces to the walls as directed by the control means.

21. An apparatus for reducing vibrations in a system comprising a) a plurality of sensors attached to the system for measuring vibration of the system at a point where the sensor is attached and generating a signal corresponding to that vibration;

b) control means connected to the sensors and receiving signals therefrom for calculating forces according to at least one of Q-coordinate method, F-coordinate method and equal eigenvalues method and directing actuates to apply the calculated forces to the system; and c) a plurality of actuators connected to the control means and attached to the system for applying forces to the system as directed by signals from the control means.

* * * * *